Patented Mar. 13, 1923.

1,448,586

UNITED STATES PATENT OFFICE.

THOMAS B. ALLEN, OF HAMILTON, ONTARIO, CANADA, ASSIGNOR TO ABRASIVE COMPANY, OF PHILADELPHIA, PENNSYLVANIA, A CORPORATION OF PENNSYLVANIA.

PROCESS OF MANUFACTURING ALUMINOUS ABRASIVES.

No Drawing.    Application filed April 22, 1922.   Serial No. 556,108.

*To all whom it may concern:*

Be it known that I, THOMAS B. ALLEN, a subject of the king of Great Britain, residing in Hamilton, Ontario, Canada, have invented a Process of Manufacturing Aluminous Abrasives, of which the following is a specification.

This invention has relation to a new and useful improvement in the manufacture of aluminous abrasives.

Aluminous abrasives are ordinarily produced by smelting a mixture of aluminous ore, such as bauxite, with carbonaceous material usually in the form of powdered coke and a metal or metallic compound such as iron or iron oxide, by the action of electrically developed heat.

The bauxite is preferably calcined and the mixture of calcined bauxite, coke and iron borings is fed into an electrical furnace of the arc type having two depending electrodes, The mixture is fed into the furnace until it is completely filled when the electric current is shut off, the electrodes removed and the molten mass allowed to cool into an ingot or pig.

This pig is removed from the furnace, crushed to suitable size, treated to remove any injurious impurities and then made into grinding wheels or other abrasive articles.

This aluminous abrasive serves admirably for certain purposes, but it has been found that aluminous abrasives free from any fluxing impurities are better adapted for certain classes of grinding, such as surface grinding, internal grinding and tool room work.

This "special" aluminous abrasive is commonly made from selected raw material either chemically purified bauxite—aluminium oxide—or certain very pure varieties of natural corundum. Both raw materials are expensive with respect to bauxite and as a consequence this special aluminous abrasive is more costly than the ordinary aluminous abrasive.

Bauxite contains beside alumina, the oxides of titanium, silicon and iron. A large percentage of these oxide impurities can be reduced to metallic form without effect on the alumina. When, however, the reduction has passed a certain degree some of the alumina is also reduced—partly to metallic form, which alloys with the other metals, and partly to aluminium carbide or other reduced alumina material.

The presence of this reduced alumina in the abrasive even in very small quantities causes the slow disintegration of the material, thereby rendering it unfit for abrasive purposes.

The existence of this aluminium carbide and its property of causing disintegration is the cause of the difficulty in preparing a very pure form of aluminous abrasive from bauxite. Many attempts have been made in recent years to overcome the preesnce of this reduced alumina, but up to the present with very limited success.

It would seem from experiments made that aluminium carbide is in equilibrium with certain concentrations of the oxides of titanium, silicon and iron in molten alumina and that it is not possible to produce a very high aluminous abrasive from bauxite by carbon reduction without forming these disintegrating reduced products of alumina.

My invention consists in reducing the impurities in beauxite by means of aluminium in place of coke. The aluminium is oxidized to alumina. In the absence of carbonaceous materials it is, therefore, possible to carry out the reduction of the oxide impurities to completion without danger of forming carbide of aluminium.

In reduction by coke a very considerable amount of electrical energy is required. In my process the reaction of the aluminium on the oxide impurities is accompained by an evolution of heat. This has the advantages of tending to drive the reaction to completion, whereas the contrary is true in reduction with coke and further there is a marked saving of electric energy per ton of abrasive.

In carrying out my invention I take calcined bauxite, for example, of the composition

| | |
|---|---|
| $H_2O$ | 0.5 |
| $Al_2O_3$ | 88.0 |
| $TiO_2$ | 4.0 |
| $SiO_2$ | 5.0 |
| $Fe_2O_3$ | 2.5 |

This is mixed in the following proportions by weight 1000 pts. calcined bauxite, 113 pts. aluminium and 100 pts. iron borings.

This mixture is placed in an electric furnace of the arc type, having two depending electrodes, preferably of graphitized carbon. The mixture is gradually fed into the furnace and melted. When the furnace is completely full and all reduction is complete, the electric furnace is disconnected, the electrodes removed and the molten material is allowed to cool and solidify in the furnace into an ingot or pig.

When cold, this pig is removed from the furnace, broken up, crushed to size, treated to remove all metallic and other impurities and then made into grinding wheels or other abrasive articles.

The advantages of my process are obvious in that starting from a raw material of low cost I am able to produce a special aluminous abrasive of very high alumina content without danger of forming aluminium carbide.

Besides metallic aluminium I can use aluminium compounds, such as the chloride, fluoride or sulphide of aluminium. I find, however, metallic aluminium more economical and preferable. By the term aluminium in the following claims, I wish to include any compound of aluminium which on reaction with aluminous ores will reduce the impurities present, namely,—the oxides of silicon, iron and titanium, to metallic form, and yield oxide of aluminium as a reaction product.

I also do not wish to limit my invention to bauxite, and in the following claims I wish to denote by aluminous ores all such materials as bauxite, gibbsite, diaspore, sillimanite, kyanite, kaolin, china clay, laterite, corundum, emery. For the purposes of this invention all aluminous ores or artificial slags containing alumina as an essential constituent are to be considered equivalent.

I also do not wish to be limited to the use of iron or iron oxide as any base metal or base metalliferous compound can be used or in certain cases can be eliminated. The function of any base metal is only to alloy with the reduced oxide impurities and by increasing their specific gravity permit a better separation from the aluminous material. They also render the alloy more readily attacked by chemical reagents and permit their easier removal.

I claim:

1. The process of manufacture of aluminous abrasives, which consists in causing an aluminious ore to react with aluminium.

2. The process of manufacture of aluminous abrasives, which consists in causing an aluminous ore to react with aluminium in the presence of base metalliferous material.

3. The process of manufacture of aluminous abrasives, which consist in smelting an aluminous ore with aluminium by means of electrically developed heat.

4. The process of manufacture of aluminous abrasives, which consists in smelting an aluminous ore with aluminium in the presence of base metalliferous material by means of electrically developed heat.

5. The process of manufacture of aluminous abrasive, which consists in smelting a calcined aluminous ore with aluminium.

6. The process of manufacture of aluminous abrasives, which consists in smelting a mixture of calcined bauxite, metallic aluminium and metallic iron.

7. The method of manufacture of substantially pure aluminous abrasive free from disintegrating impurities, which consists in treating an aluminous ore with aluminium.

THOMAS B. ALLEN.